(12) United States Patent
Chang et al.

(10) Patent No.: US 11,108,068 B2
(45) Date of Patent: Aug. 31, 2021

(54) FUEL CELL CONTROL SYSTEM

(71) Applicant: FCI CO., LTD., Daejeon (KR)

(72) Inventors: Ingab Chang, Daejeon (KR); Tae Won Lee, Goyang-si (KR)

(73) Assignee: FCI CO., LTD., Daejeon (KR)

( * ) Notice: Subject to any disclaimer, the term of this patent is extended or adjusted under 35 U.S.C. 154(b) by 36 days.

(21) Appl. No.: 16/696,335

(22) Filed: Nov. 26, 2019

(65) Prior Publication Data

US 2020/0266468 A1 Aug. 20, 2020

(30) Foreign Application Priority Data

Dec. 14, 2018 (KR) .......................... 10-2018-0161666

(51) Int. Cl.
*H01M 8/04992* (2016.01)
*H01M 8/0432* (2016.01)
(Continued)

(52) U.S. Cl.
CPC ..... *H01M 8/04992* (2013.01); *H01M 8/0432* (2013.01); *H01M 8/0491* (2013.01);
(Continued)

(58) Field of Classification Search
CPC ........... H01M 8/04992; H01M 8/0432; H01M 8/04388; H01M 8/04395; H01M 8/04679;
(Continued)

(56) References Cited

U.S. PATENT DOCUMENTS

| | | | | |
|---|---|---|---|---|
| 7,261,962 B1 * | 8/2007 | Czajkowski | ...... | H01M 8/04947 429/423 |
| 2005/0112428 A1 * | 5/2005 | Freeman | ................. | B60L 58/30 429/430 |

(Continued)

FOREIGN PATENT DOCUMENTS

| | | |
|---|---|---|
| JP | 2004-221021 A | 8/2004 |
| JP | 4114525 B2 | 7/2008 |

(Continued)

OTHER PUBLICATIONS

International Search Report dated Feb. 13, 2020 in International Application No. PCT/KR2019/014845.

(Continued)

*Primary Examiner* — Olatunji A Godo
(74) *Attorney, Agent, or Firm* — Sughrue Mion, PLLC (57) ABSTRACT

Disclosed is a control system for a fuel cell system that includes at least two or more fuel cell groups which each have at least one fuel cell connected in parallel. The fuel cell control system comprises: a unit level controller configured to control an output of an individual fuel cell; a group level controller configured to determine the output distribution of the individual fuel cells within the fuel cell group based on the performance decrease rates of the individual fuel cells within the fuel cell group; and a system level controller configured to determine the total output of the fuel cell (Continued)

system according to the power demand for the grid and determine the output distribution for each of the fuel cell groups in correspondence to the total output.

20 Claims, 5 Drawing Sheets

(51) Int. Cl.
*H01M 8/0438* (2016.01)
*H01M 8/04664* (2016.01)
*H01M 8/04746* (2016.01)
*H01M 8/04858* (2016.01)
*H01M 8/04828* (2016.01)

(52) U.S. Cl.
CPC ..... *H01M 8/0494* (2013.01); *H01M 8/04388* (2013.01); *H01M 8/04395* (2013.01); *H01M 8/04679* (2013.01); *H01M 8/04753* (2013.01)

(58) Field of Classification Search
CPC ........... H01M 8/04753; H01M 8/0491; H01M 8/0494
See application file for complete search history.

(56) References Cited

U.S. PATENT DOCUMENTS

| | | | |
|---|---|---|---|
| 2005/0278076 A1* | 12/2005 | Barbir | G08C 19/00 700/286 |
| 2009/0325007 A1* | 12/2009 | Grover | H01M 16/00 429/432 |
| 2018/0375337 A1 | 12/2018 | Nishigai | |

FOREIGN PATENT DOCUMENTS

| | | |
|---|---|---|
| JP | 2011-243447 A | 12/2011 |
| JP | 2012-160336 A | 8/2012 |
| JP | 2016-174519 A | 9/2016 |
| JP | 2017-33712 A | 2/2017 |
| KR | 10-1701604 B1 | 2/2017 |
| KR | 10-1989388 B1 | 6/2019 |
| WO | 2016/208205 A1 | 12/2016 |

OTHER PUBLICATIONS

Communication dated Feb. 8, 2019, issued by the Korean Patent Office in counterpart Korean Patent Application No. 10-2018-0161666.

* cited by examiner

FUEL CELL CONTROL SYSTEM

CROSS-REFERENCE TO RELATED APPLICATIONS

This application claims the benefit of Korean Patent Application No. 10-2018-0161666, filed with the Korean Intellectual Property Office on Dec. 14, 2018, the disclosure of which is incorporated herein by reference in its entirety.

BACKGROUND

1. Technical Field

The present disclosure relates to a control system for a fuel cell, more particularly to a system and a control method for operating the system in a stable manner by hierarchically controlling multiple parallel connected fuel cells.

2. Description of the Related Art

Generally, a fuel cell is a device for converting the energy of a fuel directly into electrical energy and generally involves a system that obtains electricity and heat through the arrangement of a pair of electrodes consisting of an anode and a cathode with an electrolyte placed in-between as well as through the electrochemical reactions of the ionized fuel gas.

A polymer electrolyte fuel cell provides the advantages of a high current density, low operating temperature, less corrosion, and low electrolyte losses, and as such, development began towards adopting the polymer electrolyte fuel cell as a power source for military and spacecraft applications. Currently, due to its advantages of high output density and simplicity, which provide the possibility of modularization, research efforts have actively focused on applications of the polymer electrolyte fuel cell as a power source for automobiles.

Recently, attention is also being given to the need for fuel cells as a dispersed power source in preparation for power shortages. In this regard, fuel cells provide higher efficiency compared to the existing internal combustion engine, lower amounts of air pollutants nitrogen oxides and sulfur dioxides discharged, and a great reduction in the amount of carbon dioxide discharged, providing great benefits in terms of environment sustainability.

Thus, power authorities are opening demand response (DR) markets, inviting companies associated with dispersed power sources to join power markets, and enforcing the renewable portfolio standard (RPS) to increase installations of fuel cells in buildings.

As the expansion of the demand resource market and the increased adoption of the renewable portfolio standard have led to the increased installation of fuel cells, there is also a demand for high-capacity fuel cells. The demand for high-capacity fuel cells has led to a need for a system that connects multiple fuel cells to provide the amounts of electrical power required by the users.

However, when responding to the power requirement of each user by connecting multiple fuel cells, it can be difficult to manage the power supply efficiently, since, for example, an anomaly in the controller can halt the operation of multiple fuel cells. As such, there is a need for a system that can manage the fuel cells in an integrated manner.

PRIOR ART DOCUMENTS (Patent Document 1) Korean Registered Patent No. 10-1701604
(Patent Document 2) International Patent Publication WO 2016/208205
(Patent Document 3) Japanese Patent Publication No. 2011-243447

SUMMARY OF THE DISCLOSURE

An aspect of the disclosure is to provide a fuel cell control system that can operate each fuel cell even when an anomaly occurs in a dispersed type fuel cell controller.

Another aspect of the disclosure is to provide a fuel cell control system that can group the dispersed controllers and assign the role of each controller so as to reduce the load on the controllers while increasing the reliability of the operation.

A control system for a fuel cell system that includes at least two or more fuel cell groups, each of which has at least one fuel cell connected in parallel, according to an example embodiment of the disclosure can include: a unit level controller configured to control the output of the individual fuel cell; a group level controller configured to determine the output distribution for each fuel cell based on the performance decrease rate of each fuel cell within the fuel cell group; and a system level controller configured to determine the total output of the fuel cell system according to the power demand for the grid and determine the output distribution for each of the fuel cell groups in correspondence to the total output.

The unit level controller can control the output of the fuel cell according to at least one control variable of fuel, air, and water, and can maintain at least one monitoring variable of the temperature, pressure, and flow rate of the fuel cell.

The group level controller can collect the control variable and the monitoring variable from the unit level controller, can process the collected control variable and monitoring variable into at least one data value of a performance decrease rate, an output change rate, and a temperature change rate, and can determine the output distribution for the single fuel cells according to the processed data value.

If an error occurs in a unit level controller, the group level controller can halt the output of the fuel cell controlled by the corresponding unit level controller.

If an error occurs in the group level controller, the unit level controller can set the output of the fuel cell as a final value and can maintain the output of the fuel cell at the set final value.

If an error occurs in the system level controller, the group level controller can set the current output of the fuel cell group as a final value and can maintain the output of the fuel cell group at the set final value.

A method of controlling a fuel cell system that includes at least two or more fuel cell groups, each of which has at least one fuel cell connected in parallel, according to another example embodiment of the disclosure can include: determining the total output of the fuel cell system according to the power demand for the grid and determining the output distribution of each of the fuel cell groups in correspondence to the total output; determining the output distribution of each of the fuel cells within a fuel cell group based on the performance decrease rate of each fuel cell within the fuel cell group; and controlling the output of each of the fuel cells.

Determining the output distribution of each of the fuel cells can include processing a control variable and a monitoring variable for the individual fuel cells into at least one data value of a performance decrease rate, an output change rate, and a temperature change rate, and determining the output distribution of the individual fuel cells according to the processed data value.

An example embodiment of the disclosure provides a fuel cell control system that can operate each fuel cell even when an anomaly occurs in a dispersed type fuel cell controller.

An example embodiment of the disclosure provides a fuel cell control system that groups the dispersedly applied controllers and assigns the role of each controller to both reduce the loads on the controllers and increase operation reliability.

Thus, by applying a dispersed control system to multiple parallel connected fuel cells, the overall power generator system can be maintained operating in a stable manner even when certain controllers become inoperable.

Additional aspects and advantages of the present disclosure will be set forth in part in the description which follows, and in part will be obvious from the description, or may be learned by practice of the disclosure.

DETAILED DESCRIPTION OF THE DISCLOSURE

In the following, certain embodiments of the disclosure are described in detail so as to allow the disclosure to be readily practiced by the person having ordinary skill in the art. However, this is not to limit the present disclosure to particular modes of practice, and it should be appreciated that the disclosure encompasses all modifications, equivalents, and substitutes lying within the spirit and technical scope of the disclosure.

When an element is mentioned as being "connected" or "joined" to another element, it should be understood that, while the element can be directly connected or joined to the other element, one or more other elements can be present in-between.

In contrast, when an element is mentioned as being "directly connected" or "directly joined" to another element, this should be understood as meaning that there are no other elements in-between.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, processes, actions, components, parts, or combinations thereof disclosed in the specification, and are not intended to preclude the possibility that one or more other features, numbers, processes, actions, components, parts, or combinations thereof may exist or may be added.

Unless defined otherwise, all terms used herein, including technical or scientific terms, have the same meanings as those generally recognized by the person having ordinary skill in the relevant field of art. Terms such as those that are defined in generally used dictionaries are to be interpreted as having meanings that agree with the context of the relevant technology and are not to be interpreted as having idealistic or excessively formal meanings unless clearly defined within the specification.

The term "module" used in the specification refers to a unit that processes a particular function or operation and can represent hardware, software, or a combination of hardware and software.

The interpretation of terms or words used in the specification and the scope of claims are not to be limited to their common or dictionary meanings, but rather, based on the principle that the inventor is able to suitably define the concepts of terms to describe his/her disclosure in the best way possible, the terms or words are to be interpreted as conveying the meanings and concepts that agree with the technical spirit of the disclosure. Furthermore, if there are no other definitions provided in particular, technical and scientific terms used herein may convey the meanings typically understood by the person having ordinary skill in the art. Any well known functions or compositions that may unnecessarily obscure the essence of the disclosure are omitted from the descriptions below and the appended drawings. The drawings introduced in the following are provided as examples, intended to aid the skilled person in sufficiently understanding the spirit of the disclosure. Thus, the disclosure is not limited to the drawings provided below and can be embodied in different forms. Also, throughout the specification, like reference numerals represent like elements. It should be noted that the same elements in the drawings are represented by the same numerals wherever possible.

Figure 1:
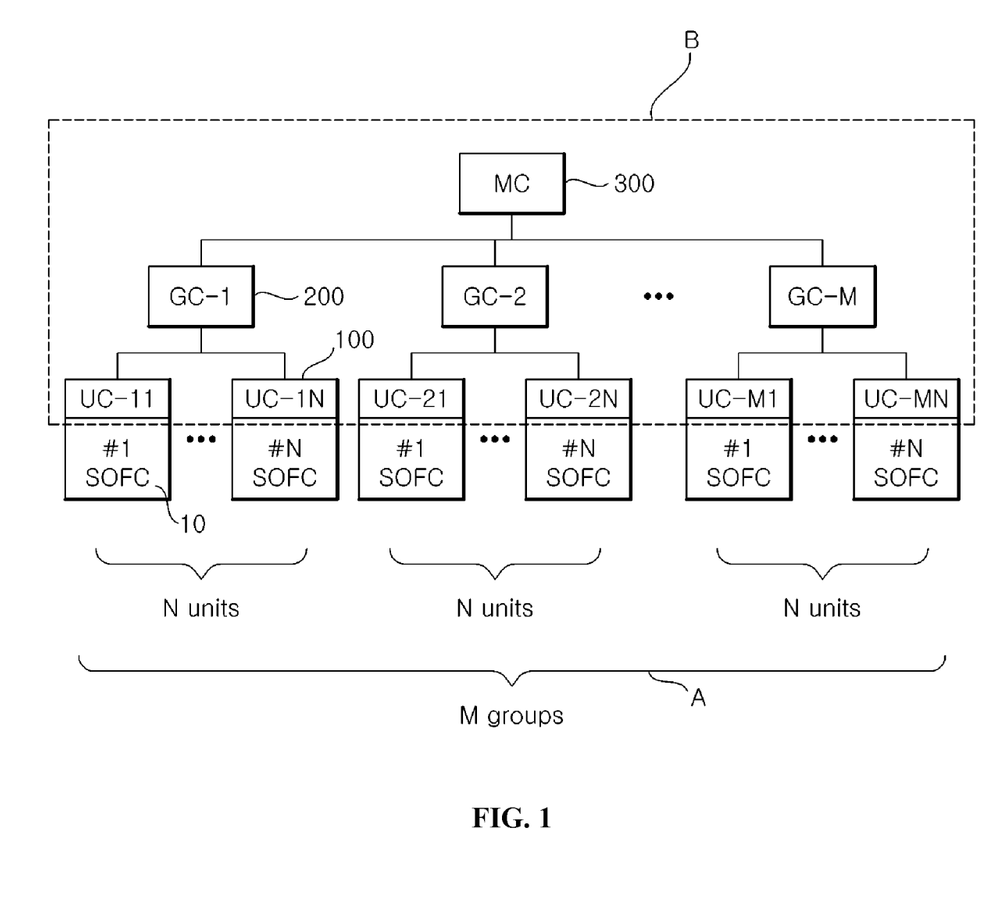
FIG. 1 is a block diagram illustrating the control of a fuel cell control system according to an example embodiment of the disclosure.

FIG. 1 is a block diagram illustrating the control of a fuel cell control system according to an example embodiment of the disclosure.

As illustrated in the figure, a multiple parallel connection fuel cell control system to which distributed control is applied according to an example embodiment of the disclosure can include a fuel cell system A, in which fuel cells (or solid oxide fuel cells (SOFC)) 10 are present in multiple connections and are grouped together, and a fuel cell control system B, which is for controlling the fuel cell system A. While the fuel cell part and the control part for controlling the fuel cell part are referred to separately as two systems for the sake of convenience, the fuel cells and the control part can be collectively referred to as a fuel cell control system.

The fuel cell system A may include fuel cell groups that are divided into an M number of groups (Groups 1~M), with each group having an N number of fuel cells 10 (#1~#N) connected in parallel. That is, according to an example embodiment of the disclosure, the fuel cells 10 may be partitioned into N*M cells, where each fuel cell 10 can be controlled to output power individually, in groups, or collectively.

The fuel cell system A may be installed in a building or a particular facility and may be composed of fuel cells 10 that produce electrical power for supplying to the users.

Such a fuel cell system A may receive a power amount requested by a user and may supply power to the user in accordance with the received power amount.

The fuel cells 10 can each include a fuel cell stack, reformer, power transformer, etc., and can include an industrial utility such as a valve or a breaker. A fuel cell stack generates electrical energy, i.e. direct-current power, through electrochemical reactions where the oxidation reaction of hydrogen and the reduction reaction of oxygen occur simultaneously. A reformer serves to reform the fuel supplied to the fuel cell stack. Also, a power transformer serves to transform the direct current generated from the fuel cell stack into an alternating current. To this end, the power transformer can include a DC-AC inverter (not shown) that transfers the direct current outputted from the fuel cell stack into an alternating current for use in the power system.

On the other hand, the fuel cell control system B according to this example embodiment can include unit level controllers (UC) 100 that are connected to the individual fuel cells 10 to control the output of the fuel cells 10, group level controllers (GC) 200 that each control a fuel cell group (1~M), which includes N individual fuel cells 10, and a system level controller (or master controller (MC)) 300 that provides overall control of the unit level controllers 100 and the group level controllers 200.

A unit level controller 100 may be connected with an individual fuel cell 10 in series, i.e. in an individual and direct manner, to adjust the amount of power generation of the fuel cell 10 according to the amount of power generation requested by the group level controller 200.

To this end, the unit level controller 100 may control the output of the fuel cell 10 according to at least one control variable of fuel, air, and water, and may maintain at least one monitoring variable of the temperature, pressure, and flow rate of the fuel cell 10.

A group level controller 200 may be connected in parallel with an N number of unit level controllers (UC-11~UC-1N . . . UC-M1~UC-MN 100), and in this example embodiment, an M number of group level controllers 200 (GC-1~GC-M) may be connected between the unit level controllers 100 and the system level controller 300. That is, the M number of group level controllers 200 may serve as interfaces between the N*M number of unit level controllers 100 and the system level controller 300.

A group level controller 200 can control the utilities, including the valves, breakers, etc., of the fuel cell group and can determine the output distribution of the individual fuel cells 10 within the fuel cell group based on the performance decrease rates of the fuel cells 10 within the fuel cell group. To determine the outputs of the fuel cells 10, the group level controller 200 may collect the control variables and monitoring variables from the unit level controllers 100. The group level controller 200 can process the collected control variables and monitoring variables into at least one data values of performance decrease rate, output change rate, and temperature change rate. The output distribution of the fuel cells 10 can be determined and adjusted according to the processed data values.

The initial power generation amount of an individual fuel cell 10 connected in parallel to a group level controller 200 can be expressed as the total required power generation amount/the number of fuel cells 10 (N*M). When starting the power generation of the fuel cells 10 in response to a request of the system level controller 300, the group level controller 200 may periodically check the statuses of the individual fuel cells 10. The amount of power generation of a fuel cell 10 can vary with time according to external circumstances or according to errors occurring in the unit level controller 100 or the group level controller 200 or can be fixed to a final setting value.

The system level controller 300 can determine the total output of the fuel cell system A according to the power demand of the power grid and can determine the output distribution of each of the fuel cell groups in correspondence to the total output.

In order to determine the total output, the system level controller 300 can reference the power generation status of renewable energy sources other than the fuel cell system A, and the total output of the fuel cell power generation system can be determined in correspondence to the amount of power outputted from the renewable energy sources.

The system level controller 300 can control utilities including the main valve, breaker, etc., of the fuel cell system A.

Also, the fuel cell control system B according to an example embodiment of the disclosure can include a display part and a manipulation part as interfaces for enabling a user to control the fuel cells and can further include a communication part for controlling communications between each element, the fuel cell system A, and the fuel cell control system B.

The user can connect to the fuel cell control system B via a user interface to monitor the output changes of the fuel cells 10. The user interface can display the output changes of the fuel cells 10 connected in parallel to the fuel cell control system B in real time to control the operation of the fuel cell control system B. Such a user interface can be merged with the overall control system 300.

Also, the communication part can be connected between the user interface and the fuel cell control system B and can transmit to the user interface an indication of whether or not there are anomalies in the fuel cells 10 according to the output changes of the fuel cells 10.

Figure 2:
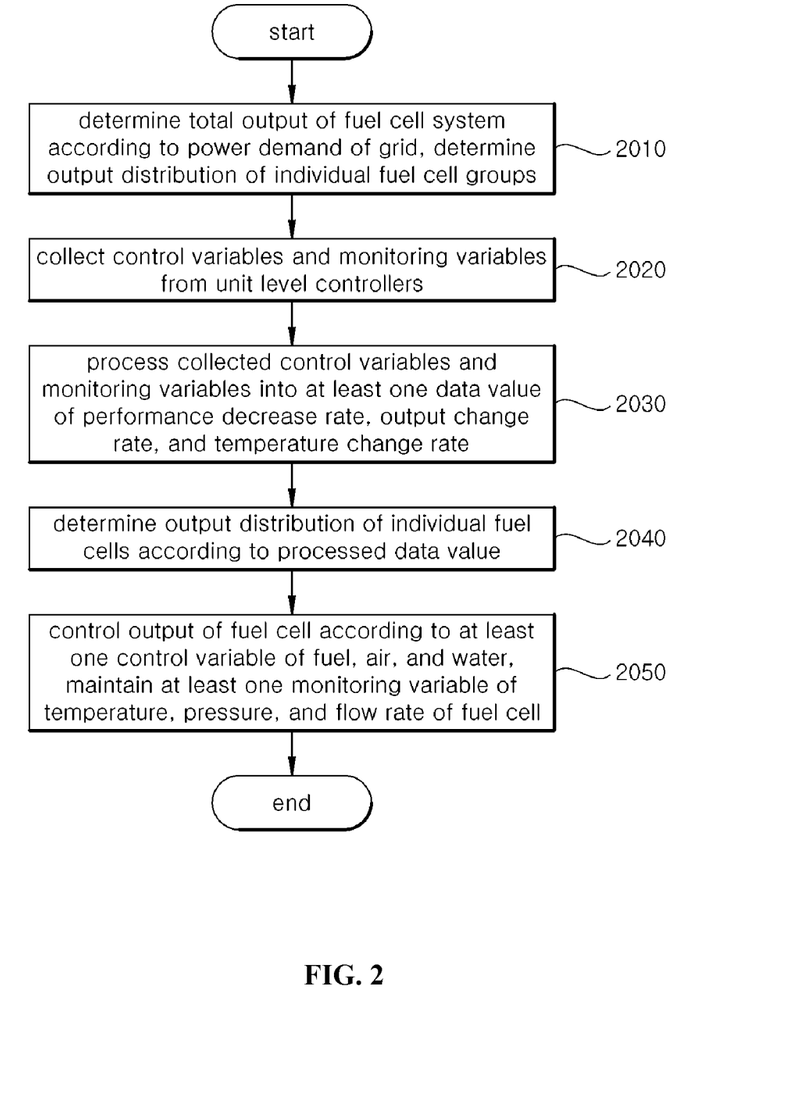
FIG. 2 is a flow diagram illustrating a fuel cell control method according to an example embodiment of the disclosure.

FIG. 2 is a flow diagram illustrating a fuel cell control method according to an example embodiment of the disclosure.

First, the essence of the fuel cell control method according to an example embodiment of the disclosure is to group the individual fuel cells 10 that are connected in parallel and manage control modules for controlling the individual fuel cells 10 and the grouped fuel cells in an independent yet organic and flexible manner.

To this end, the system level controller 300 may determine the total output of the fuel cell system according to the power demand of the grid and determine the output distribution of the fuel cell groups in correspondence to the total output (operation 2010). As described above, the total output of the fuel cell system A can be determined in consideration of the amount of power production from renewable energy sources.

If there is no power demand from the user or the total power output amount has not been decided, the system level controller 300 can operate the fuel cell system A and fuel cell control system B in standby mode and maintain a power save mode.

Afterwards, power distribution by the group level controllers 200 may be performed.

The group level controllers 200 can collect control variables and monitoring variables for each fuel cell 10 (operation 2020).

According to this example embodiment, the control variables for the individual fuel cells 10 can include at least one of fuel, air, and water, the monitoring variables can include at least one of temperature, pressure, and flow rate, and the control variables and the monitoring variables can be provided by the unit level controllers 100 to the group level controller 200.

The group level controller 200 can process the control variables and monitoring variables thus collected into at least one data value of performance decrease rate, output change rate, and temperature change rate (operation 2030).

According to the data values thus processed, the output distribution of the individual fuel cells 10 may be determined (operation 2040).

When the output distribution for the individual fuel cells 10 is determined, each unit level controller 100 may control the output of the fuel cell according to at least one of fuel, air, and water, and may monitor the power generation of the fuel cell 10 while maintaining a variable of at least one of the temperature, pressure, and flow rate of the fuel cell 10 (operation 2050).

The outputs of the fuel cell groups and the individual fuel cells 10 can be distributed evenly, or the outputs of certain fuel cell groups or fuel cells 10 can be increased or decreased according to various circumstances or according to user settings.

Also, the outputs of the fuel cell groups can be monitored periodically or continuously at the group level controllers 200, and the outputs of the individual fuel cells 10 can be monitored periodically or continuously at the unit level controllers 100.

Also, in a fuel cell control system B according to this example embodiment, any malfunctions or anomalies in a unit level controller 100 can be sensed and monitored at the group level controller 200 or at the system level controller 300, and any malfunctions or anomalies in a group level controller 200 can be monitored by the system level controller 300. If an anomaly occurs in the system level controller 300, the fuel cell system A and fuel cell control system B can be operated according to a preset method, or the operation of the system can be halted. In this way, if an anomaly occurs in a controller 100, 200, 300, various methods can be used to provide control according to a dispersed control method, and the outputs of the individual fuel cells 10 can be adjusted correspondingly.

Figure 3:
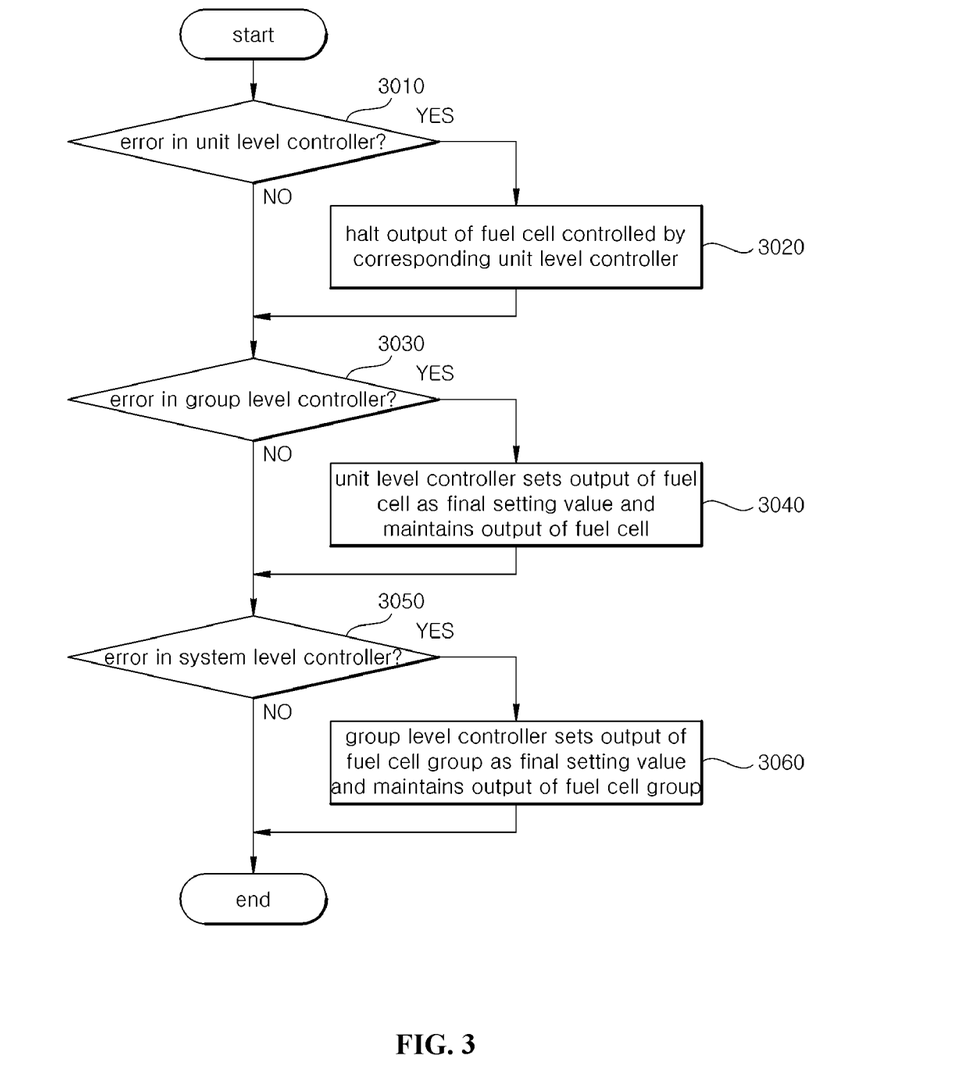
FIG. 3 is a flow diagram illustrating a fuel cell control method according to another example embodiment of the disclosure.

FIG. 3 is a flow diagram illustrating a fuel cell control method according to another example embodiment of the disclosure. The following provides a description of a control method used when an anomaly occurs in each controller, with reference to FIG. 3.

First, the group level controller 200 or the system level controller 300 can periodically determine whether or not an error has occurred in the unit level controllers 100 (operation 3010).

If the result of the determining shows that an error has occurred in a unit level controller 100, then the group level controller 200 can halt the output of the fuel cell 10 controlled by the unit level controller 100 experiencing an error (operation 3020).

In a fuel cell system a parallel structure according to the related art, if an error occurs in one controller controlling a fuel cell, then the outputs of all of the parallel connected fuel cells would be halted. In contrast, according to this example embodiment, the system can be operated in a flexible manner such that, even if an anomaly occurs in a particular controller, the output of only the individual fuel cell 10 may be halted, and the other fuel cells may continue outputting power.

On the other hand, if there are no errors occurring in the unit level controllers 100 or after the output of a fuel cell 10 has been controlled, the system level controller 300 can determine whether or not an error has occurred in a group level controller 200 (operation 3030).

If the result of the determining shows that an error has occurred in a particular group level controller 200, then the unit level controllers 100 connected to the group level controller 200 experiencing an error may set the outputs of the individual fuel cells 10 as final setting values and maintain the outputs of the fuel cells (operation 3040).

In other words, even if a particular group level controller 200 experiences an error and thus cannot function, the individual fuel cells 10 that were controlled by the group level controller 200 can still operate normally. For example, the outputs of the individual fuel cells 10 can be set to the final setting value that was set most recently as described above or can be set to a particular output value designated for operation during an error.

On the other hand, if there are no errors occurring in the group level controllers 200 or after the outputs of the fuel cells 10 have been controlled in response to an error in a group level controller 200, it can be determined whether or not an error has occurred in the system level controller 300 (operation 3050).

If an error has occurred in the system level controller 300, an alarm can be generated through a user interface to indicate an error in the fuel cell control system B, and the control system can be operated in an error mode.

If the result of the determining shows that an error has occurred in the system level controller 300, then the group level controllers 200 may set the outputs of their respectively connected fuel cell groups as final setting values and maintain the outputs of the fuel cell groups (operation 3060).

Since the outputs of the fuel cell groups can be maintained at the final setting values even when an error occurs in the system level controller 300, the individual fuel cells 10 can also continue to operate. That is, even if a particular controller for controlling a fuel cell experiences a malfunction, a shutdown of the entire fuel cell system A and fuel cell control system B can be prevented, and the time needed for recovering the controller experiencing an error can be obtained.

The operations for determining whether or not an error has occurred in a controller of a particular level (operations 3010, 3030, 3050) can be performed sequentially as in the illustrated figure, or each of the determining operations can be performed independently according to a certain cycle.

Figure 4:
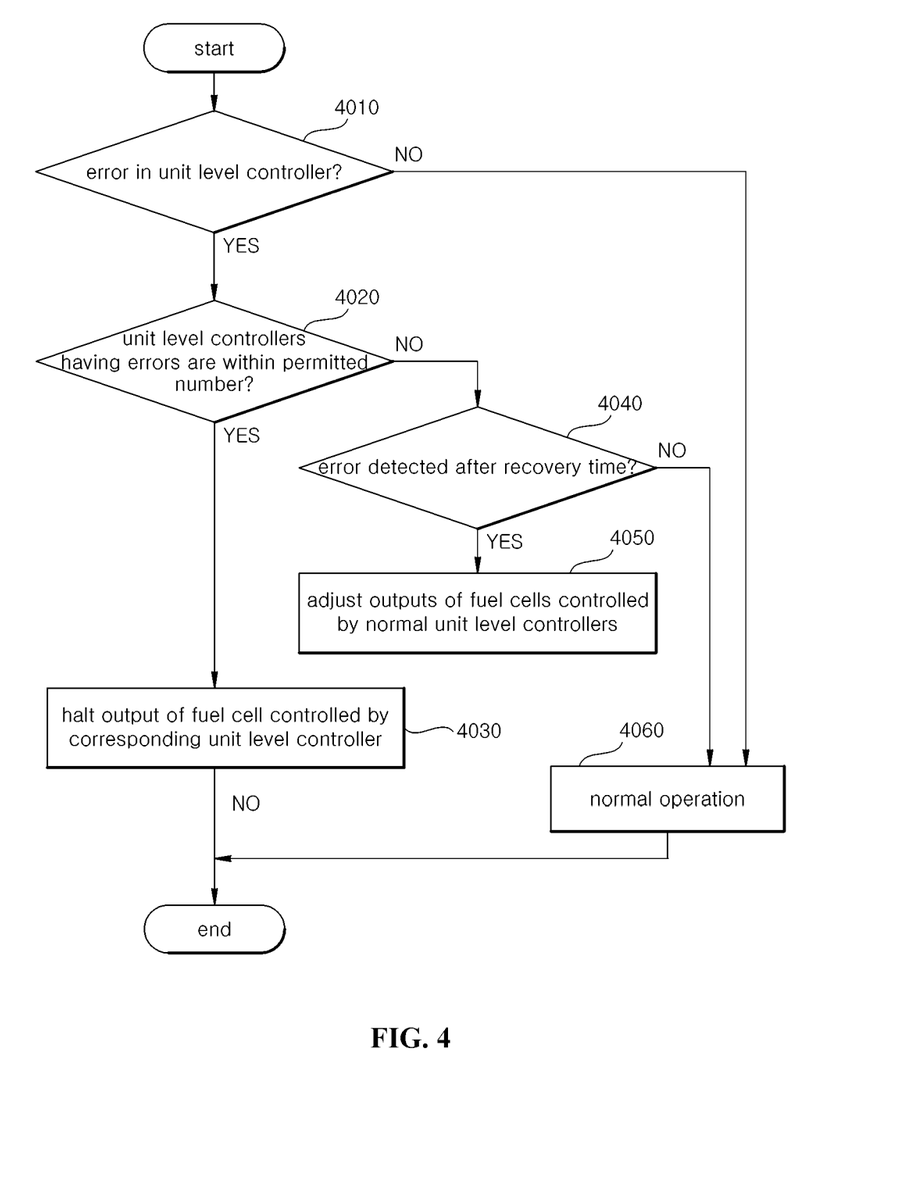
FIG. 4 is a flow diagram illustrating a fuel cell control method according to still another example embodiment of the disclosure.

FIG. 4 is a flow diagram illustrating a fuel cell control method according to still another example embodiment of the disclosure. The following provides a description of a control method used when an anomaly occurs in the unit level controllers, with reference to FIG. 4.

As in the illustrated figure, it can be determined whether or not an error has occurred in a unit level controller 100 (operation 4010).

If there are no errors in the unit level controllers 100, then the fuel cell system A and fuel cell control system B may be operated as normal (operation 4060).

However, if it is determined that an error has occurred in a unit level controller 100, then it can further be determined whether or not the number of unit level controllers 100 experiencing an error is within a permitted number (operation 4020).

If the unit level controllers 100 experiencing an error is within the permitted number, then, similarly to the example embodiment described with reference to FIG. 3, the group level controller 200 can halt the outputs of the fuel cells 10 controlled by the corresponding unit level controllers 100 experiencing an error (operation 4030).

Alternatively, in another example, the group level controller 200 can also maintain the outputs of the fuel cells 10 controlled by the corresponding unit level controllers 100 at their final setting values.

However, if the number of unit level controllers 100 experiencing an error exceeds the permitted number, then a procedure entailing the user recovering the controllers can be performed, and it can be determined whether or not an error is still detected after a particular recovery time (operation 4040).

During the recovery by the user, the outputs of the fuel cells 10 can be halted or maintained at their final setting values.

However, if the error in a unit level controller 100 is not recovered after a particular duration of time, the output of the fuel cell 10 can be halted so that the amount of power from the fuel cell system A can be less than the required amount, and even if the output of the fuel cell 10 is maintained at a final setting value, this can still result in an insufficient amount of power.

To resolve this, according to this example embodiment, if an error is still detected in the unit level controller 100 even after a particular recovery time, the group level controller 200 can adjust, e.g. increase, the outputs of the fuel cells 10 controlled by normal unit level controllers 100 (operation 4050). This is to compensate for the amount of power from the fuel cell 10 that is controlled by the unit level controller 100 experiencing an error and entails increasing the amounts of power output from the other remaining fuel cells 10.

If the unit level controller 100 experiencing an error is recovered within the recovery time set as a threshold value so that the error is no longer detected, then the fuel cell 10 can be operated as normal (operation 4060).

Figure 5:
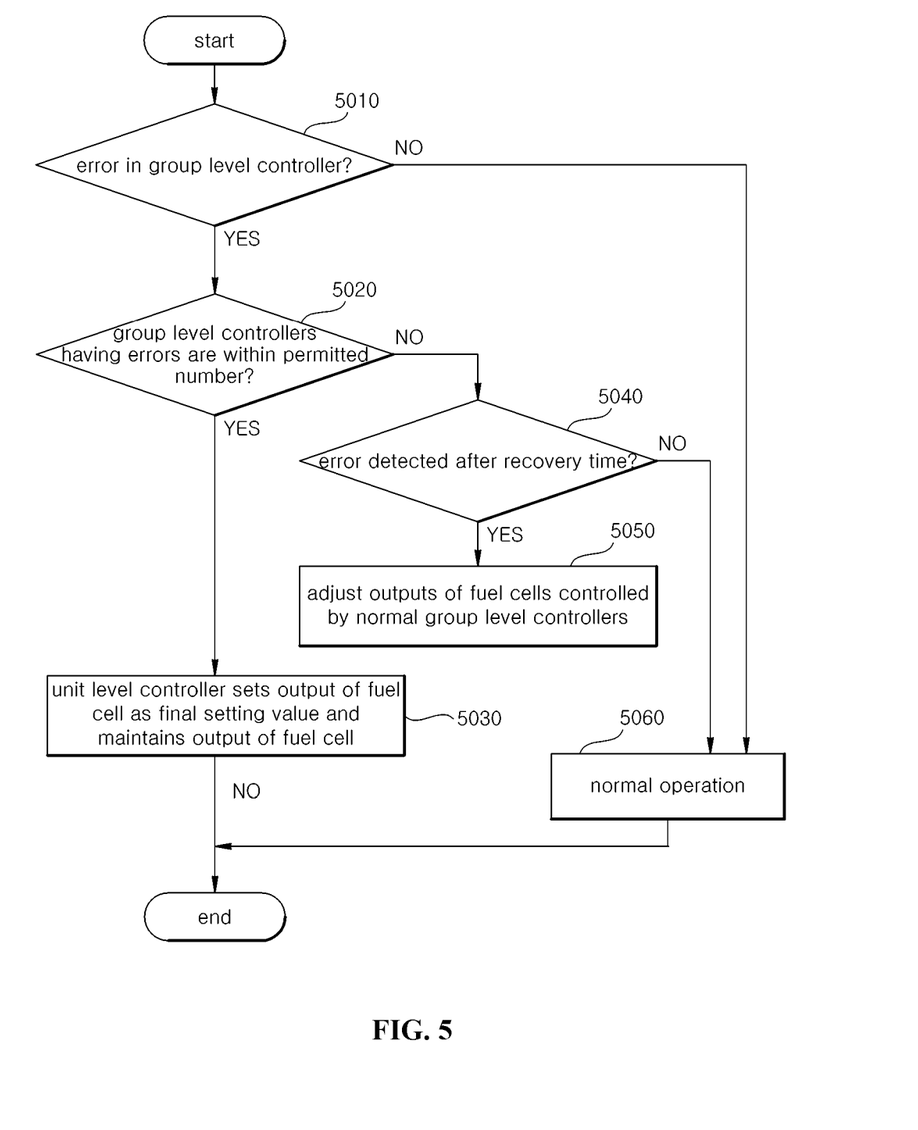
FIG. 5 is a flow diagram illustrating a fuel cell control method according to yet another example embodiment of the disclosure.

FIG. 5 is a flow diagram illustrating a fuel cell control method according to yet another example embodiment of the disclosure. The following provides a description of a control method used when an anomaly occurs in the group level controllers, with reference to FIG. 5.

FIG. 5 is similar to the control procedures performed when an error occurs in the unit level controllers described above reference to FIG. 4.

First, it can be determined whether or not an error has occurred in a group level controller 200 (operation 5010).

Such monitoring can be performed regardless of whether or not an error has occurred in a unit level controller 100 in FIG. 4 or can be performed subsequently to a determining result indicating that there is an error in the unit level controller 100.

If there are no errors in the group level controllers 200, then the fuel cell system A and fuel cell control system B may be operated as normal (operation 5060).

However, if it is determined that an error has occurred in a group level controller 200, then it can further be determined whether or not the number of group level controllers 200 experiencing an error is within a permitted number (operation 5020).

If the group level controllers 200 experiencing an error is within the permitted number, then the outputs of the fuel cells 10 controlled by the unit level controllers 100 connected to the group level controllers 200 experiencing an error can be maintained at their final setting values (operation 5030).

Alternatively, in another example, the outputs of the fuel cells 10 controlled by the unit level controllers 100 connected to the group level controllers 200 experiencing an error can also be halted.

However, if the number of group level controllers 200 experiencing an error exceeds the permitted number, then a procedure entailing the user recovering the controllers can be performed, and it can be determined whether or not an error is still detected after a particular recovery time (operation 5040).

During the recovery by the user, the outputs of the fuel cells 10 can be halted or maintained at their final setting values.

However, if the error in a group level controller 200 is not recovered after a particular duration of time, the outputs of the fuel cells 10 can be halted so that the amount of power from the fuel cell system A can be less than the required amount, and even if the outputs of the fuel cells 10 are maintained at their final setting values, this can still result in an insufficient amount of power.

To resolve this, according to this example embodiment, if an error is still detected in the group level controller 200 even after a particular recovery time, the system level controller 300 can adjust, e.g. increase, the outputs of the fuel cell groups controlled by normal group level controllers 200 (operation 5050). This is to compensate for the amount of power from the fuel cell group that is controlled by the group level controller 200 experiencing an error and entails increasing the amounts of power output from the other remaining fuel cell groups.

If the group level controller 200 experiencing an error is recovered within the recovery time set as a threshold value so that the error is no longer detected, then the fuel cell group can be operated as normal (operation 5060).

As described above, an example embodiment of the disclosure provides a method of operating a fuel cell power generation system in which several small solid oxide fuel cells (SOFC) that provide freely adjustable outputs are combined into one system, where the method can provide a stable output without affecting the overall system even in the event of an anomaly in one or more of the controllers.

The skilled person would easily understand that certain partial functions of the fuel cell control system described above can be tangibly embodied in the form of a program of instructions to be included and provided in a recorded medium readable by a computer. The computer-readable medium can include program instructions, data files, data structures, etc., alone or in combination. The program instructions recorded on the computer-readable medium can be designed and configured specifically for the embodiment or can be a type known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, USB memory, etc. The computer-readable medium can also be a transmission medium such as rays, metal wires, waveguides, etc., that transport carrier waves for transmitting signals that designate program instructions, data structures, etc. Examples of the program of instructions may include not only machine language codes produced by a compiler but also high-level language codes that can be executed by a computer through the use of an interpreter, etc. The hardware device mentioned above can be made to operate as one or more software modules that perform the actions of the embodiments, and vice versa.

It should be apparent that the present disclosure is not limited to the embodiments described above, the disclosure can be used for a great variety of applications, and various modifications can be derived without departing from the essence of the disclosure as set forth in the scope of claims.

What is claimed is:

1. A fuel cell system comprising:
    a system level controller; and
    a plurality of fuel cell groups, wherein each of the plurality of fuel cell groups includes a group level controller, a plurality of unit level controllers connected to the group level controller, and a plurality of fuel cells respectively connected to the plurality of unit level controllers, each fuel cell of the plurality of fuel cells being connected to a corresponding unit level controller among the plurality of unit level controllers,
    wherein each unit level controller of the plurality of unit level controllers is configured to control an output of the connected fuel cell,
    wherein the group level controller included in each fuel cell group of the plurality of fuel cell groups is configured to determine an output distribution for each fuel cell of the plurality of fuel cells within the fuel cell group based on a performance decrease rate of each fuel cell of the plurality of fuel cells within the fuel cell group; and
    wherein the system level controller is configured to determine a total output of the fuel cell system according to a power demand for a grid and determine an output distribution for each fuel cell group of the plurality of fuel cell groups within the total output.

2. The fuel cell system of claim 1, wherein the unit level controller controls the output of the fuel cell according to at least one control variable of fuel, air, and water, and
    maintains at least one monitoring variable of a temperature, pressure, and flow rate of the fuel cell.

3. The fuel cell system of claim 2, wherein the group level controller collects the control variable and the monitoring variable from the unit level controller,
    processes the collected control variable and monitoring variable into at least one data value of a performance decrease rate, an output change rate, and a temperature change rate, and
    determines the output distribution for the plurality of fuel cells in the fuel cell group according to the processed data value.

4. The fuel cell system of claim 1, wherein, if an error occurs in the system level controller, a group level controller connected to the system level controller sets a current output as a final value and maintains an output of the fuel cell group at the set final value.

5. A fuel cell system comprising:
    a system level controller; and
    a plurality of fuel cell groups, wherein each of the plurality of fuel cell groups includes a group level controller, a plurality of unit level controllers connected to the group level controller, and a plurality of fuel cells respectively connected to the plurality of unit level controllers, each fuel cell of the plurality of fuel cells being connected to a corresponding unit level controller among the plurality of unit level controllers,
    wherein each unit level controller of the plurality of unit level controllers is configured to control an output of the connected fuel cell,
    wherein the group level controller included in each fuel cell group of the plurality of fuel cell groups is configured to determine an output distribution for each fuel cell of the plurality of fuel cells within the fuel cell group based on a performance decrease rate of each fuel cell of the plurality of fuel cells within the fuel cell group,
    wherein the system level controller is configured to determine a total output of the fuel cell system according to a power demand for a grid and determine an output distribution for each fuel cell group of the plurality of fuel cell groups within the total output, and
    wherein, if an error occurs in the unit level controller of any fuel cell, the group level controller halts an output of the fuel cell of the unit level controller experiencing the error.

6. The fuel cell system of claim 5, wherein, if a number of unit level controllers experiencing an error is within a permitted number, the group level controller halts the output of the fuel cell of the unit level controller experiencing the error.

7. The fuel cell system of claim 5, wherein, if a number of unit level controllers experiencing an error exceeds a permitted number, the group level controller halts the output of the fuel cell of the unit level controller experiencing the error for a preset recovery time.

8. The fuel cell system of claim 7, wherein, if the error of the unit level controller has not been recovered after the recovery time, the group level controller increases outputs of fuel cells of other normal unit level controllers.

9. A fuel cell system comprising:
    a system level controller; and
    a plurality of fuel cell groups, wherein each of the plurality of fuel cell groups includes a group level controller, a plurality of unit level controllers connected to the group level controller, and a plurality of fuel cells respectively connected to the plurality of unit level controllers, each fuel cell of the plurality of fuel cells being connected to a corresponding unit level controller among the plurality of unit level controllers,
    wherein each unit level controller of the plurality of unit level controllers is configured to control an output of the connected fuel cell,
    wherein the group level controller included in each fuel cell group of the plurality of fuel cell groups is configured to determine an output distribution for each fuel cell of the plurality of fuel cells within the fuel cell group based on a performance decrease rate of each fuel cell of the plurality of fuel cells within the fuel cell group,
    wherein the system level controller is configured to determine a total output of the fuel cell system according to a power demand for a grid and determine an output distribution for each fuel cell group of the plurality of fuel cell groups within the total output, and
    wherein, if an error occurs in the unit level controller of any fuel cell, the group level controller connected to the unit level controller experiencing the error sets a current output of a corresponding fuel cell as a final value and maintains an output of the fuel cell at the set final value.

10. The fuel cell system of claim 9, wherein, if a number of unit level controllers experiencing an error is within a permitted number, the group level controller sets a current output of a fuel cell of a unit level controller experiencing the error as a final value and maintains an output of the fuel cell at the set final value.

11. The fuel cell system of claim 9, wherein, if a number of unit level controllers experiencing an error exceeds a permitted number, the group level controller sets a current output of a fuel cell of a unit level controller experiencing the error as a final value and maintains an output of the fuel cell at the set final value for a preset recovery time.

12. A fuel cell system comprising:
a system level controller; and
a plurality of fuel cell groups, wherein each of the plurality of fuel cell groups includes a group level controller, a plurality of unit level controllers connected to the group level controller, and a plurality of fuel cells respectively connected to the plurality of unit level controllers, each fuel cell of the plurality of fuel cells being connected to a corresponding unit level controller among the plurality of unit level controllers,
wherein each unit level controller of the plurality of unit level controllers is configured to control an output of the connected fuel cell,
wherein the group level controller included in each fuel cell group of the plurality of fuel cell groups is configured to determine an output distribution for each fuel cell of the plurality of fuel cells within the fuel cell group based on a performance decrease rate of each fuel cell of the plurality of fuel cells within the fuel cell group,
wherein the system level controller is configured to determine a total output of the fuel cell system according to a power demand for a grid and determine an output distribution for each fuel cell group of the plurality of fuel cell groups within the total output, and
wherein, if an error occurs in any group level controller, a unit level controller connected to the group level controller experiencing the error sets a current output of a fuel cell as a final value and maintains an output of the fuel cell at the set final value.

13. The fuel cell system of claim 12, wherein, if a number of group level controllers experiencing an error is within a permitted number, a unit level controller connected to the group level controller experiencing the error sets a current output of a fuel cell as a final value and maintains an output of the fuel cell at the set final value.

14. A fuel cell system comprising:
a system level controller; and
a plurality of fuel cell groups, wherein each of the plurality of fuel cell groups includes a group level controller, a plurality of unit level controllers connected to the group level controller, and a plurality of fuel cells respectively connected to the plurality of unit level controllers, each fuel cell of the plurality of fuel cells being connected to a corresponding unit level controller among the plurality of unit level controllers,
wherein each unit level controller of the plurality of unit level controllers is configured to control an output of the connected fuel cell,
wherein the group level controller included in each fuel cell group of the plurality of fuel cell groups is configured to determine an output distribution for each fuel cell of the plurality of fuel cells within the fuel cell group based on a performance decrease rate of each fuel cell of the plurality of fuel cells within the fuel cell group,
wherein the system level controller is configured to determine a total output of the fuel cell system according to a power demand for a grid and determine an output distribution for each fuel cell group of the plurality of fuel cell groups within the total output, and
wherein, if an error occurs in any group level controller, a unit level controller connected to the group level controller experiencing the error halts an output of a fuel cell.

15. The fuel cell system of claim 14, wherein, if a number of group level controllers experiencing an error is within a permitted number, unit level controllers connected to the group level controller experiencing the error halt the output of the fuel cell.

16. The fuel cell system of claim 14, wherein, if a number of group level controllers experiencing an error exceeds a permitted number, unit level controllers connected to the group level controller experiencing the error halt the output of the fuel cell for a preset recovery time.

17. The fuel cell system of claim 16, wherein, if the error of the group level controller has not been recovered after the recovery time, the system level controller increases outputs of fuel cell groups controlled by other normal group level controllers.

18. A method of controlling a fuel cell system including a plurality of fuel cell groups, each fuel cell group of the plurality of fuel cell groups having a plurality of fuel cells connected in parallel, the method comprising:
determining a total output of the fuel cell system according to a power demand for a grid and determining an output distribution of each of the plurality of fuel cell groups within the total output, the determining of the total output and the determining of the output distribution of each of the fuel cell groups being performed by a system level controller;
determining an output distribution of a plurality of fuel cells within a fuel cell group of the plurality of fuel cell groups based on a performance decrease rate of each fuel cell of the plurality of fuel cells within the fuel cell group, the determining of the output distribution of the plurality of fuel cells being performed by a group level controller; and
controlling an output of each of the plurality of fuel cells, the controlling performed by a unit level controller.

19. The method of controlling a fuel cell system according to claim 18, wherein the unit level controller controls the output of the fuel cell according to at least one control variable of fuel, air, and water, and
maintains at least one monitoring variable of a temperature, pressure, and flow rate of the fuel cell.

20. The method of controlling a fuel cell system according to claim 19, wherein the group level controller collects the control variable and the monitoring variable from the unit level controller,
processes the collected control variable and monitoring variable into at least one data value of a performance decrease rate, an output change rate, and a temperature change rate, and
determines the output distribution for the plurality of fuel cells according to the processed data value.

* * * * *